3,148,065
MEROCYANINES AND UNDISSOCIATED
CYANINE DYES
Arnold C. Craig and Leslie G. S. Brooker, Rochester, N.Y., assignors to Eastman Kodak Company, Rochester, N.Y., a corporation of New Jersey
No Drawing. Filed June 10, 1963, Ser. No. 286,487
15 Claims. (Cl. 96—105)

This invention relates to merocyanine and undissociated cyanine dyes derived from 3-thietanone-1,1-dioxide and certain of its derivatives, and more particularly to the undissociated, trinuclear cyanine dye species, to methods for preparing such dyes and to photographic emulsions and elements containing these new dyes.

Polymethine dyes such as merocyanines have been previously prepared from certain heterocyclic compounds of the rhodanine series, pyrazolone series, etc.

We have now found a new class of dyes can be prepared from certain derivatives of the four-membered heterocyclic compound 3-thietanone-1,1dioxide which are particularly useful as optical sensitizers for photographic silver halide emulsions and photographic elements produced therewith. The new cyanine dyes of the invention do not contain the conventional acid anions such as iodide, chloride, etc., and we have accordingly designated these new dyes as undissociated dyes.

The new dyes of our invention include those represented by one or the other of the following structural formulas:

(I)

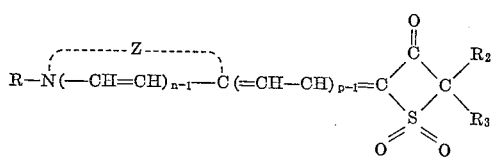

and (II)

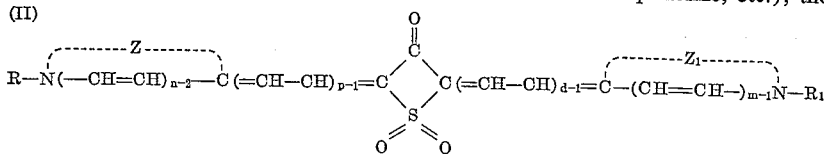

wherein $n$ and $m$ each represents a positive integer of from 1 to 2, $p$ and $d$ each represents a positive integer of from 1 to 3, R and $R_1$ each represents an alkyl group of from 1 to 12 carbon atoms, e.g., methyl, ethyl, propyl, isopropyl, butyl, sec-butyl, amyl, decyl, dodecyl, β-hydroxyethyl, γ-hydroxypropyl, β-methoxyethyl, β-ethoxyethyl, allyl, benzyl, β-phenylethyl, β-carboxyethyl, carboxymethyl, γ-carboxypropyl, β-acetoxyethyl, γ-acetoxypropyl, methoxycarbonylmethyl, ethoxycarbonylethyl, sulfomethyl, β-sulfoethyl, γ-sulfopropyl, ω-sulfobutyl, etc., $R_2$ and $R_3$ each represents a group selected from the class consisting of hydrogen, an alkyl group of from 1 to 8 carbon atoms (e.g., methyl, ethyl, propyl, isopropyl, butyl, sec-butyl, amyl, hexyl, octyl, etc.), and a monocyclic aryl group (e.g., phenyl, tolyl, or ethylphenyl, etc.) and Z and $Z_1$ each represents the nonmetallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thianaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2-hydroxypyridine, 3-hydroxypyridine, etc.), etc. Of these new dyes set forth above, the trinuclear dyes represented by above Formula II, including both the bis and unsymmetrical species, have been found to be especially efficacious sensitizers for photographic silver halide emulsions, and are preferred.

It is, accordingly, an object of the invention to provide a new class of merocyanine and undissociated cyanine dyes containing a 3-thietanone-1,1-dioxide nucleus. A further object is to provide methods for making these new dyes. A still further object is to provide photographic silver halide emulsions sensitized with these new dyes, and more particularly with the trinuclear, and photographic elements prepared with such emulsions. Another object is to provide methods for making such photographic materials. Other objects will become apparent from a consideration of the description and the following examples.

In accordance with our invention, we prepare the new dyes represented by the above Formula I wherein $p$ represents the integer 2 or 3 by reacting a 3-thietanone-1,1-dioxide compound having the general formula:

(III) 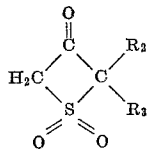

wherein $R_2$ and $R_3$ are as previously defined, with a cycloammonium quaternary salt selected from those represented by the following general formula:

(IV) 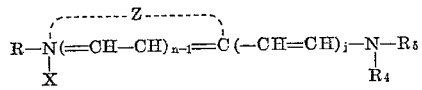

wherein $n$, R and Z are as defined above, $j$ represents the integer 1 or 2, $R_4$ represents an acyl group of a monobasic carboxylic acid containing from 2–7 carbon atoms, e.g., acetyl, propionyl, butyryl, benzoyl, etc., $R_5$ represents a monocyclic aryl group of from 6–7 carbon atoms, e.g., phenyl or tolyl groups, and X represents an acid anion, e.g., chloride, bromide, iodide, thiocyanate, sulfamate, methyl sulfate, ethyl sulfate, perchlorate, p-toluenesulfonate, and the like anions. The condensation reactions are carried out in approximately equimolar proportions of the compounds of above Formulas III and IV, at ambient temperatures with vigorous stirring, for a period up to one or more hours, preferably in an inert solvent medium such as methanol, ethanol, n-propanol, n-butanol, pyridine, quinoline, isoquinoline, N,N-dimethyl formamide, etc., and advantageously in the presence of a basic condensation agent such as a trialkylamine, e.g., triethylamine, tri-n-propylamine, tri-n-butylamine, etc., or N-methylpiperidine, N-ethylpiperidine, N,N-dimethylaniline, and the like. The dye product can be filtered off, washed for example with methanol and recrystallized from ethanol.

The new dyes represented by Formula I in which $p$ represents the integer 1, are prepared by reacting as described previously a 3-thietanone-1,1-dioxide of Formula III with a cycloammonium quaternary salt selected from those represented by the following formula:

(V) 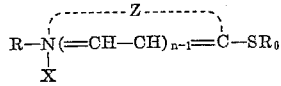

wherein $n$, X, R and Z are as defined previously, and wherein $R_6$ represents an alkyl group of from 1–12 carbon atoms, phenyl, benzyl, or tolyl groups, instead of the quaternary salt of Formula IV.

For the preparation of the preferred undissociated trinuclear dyes of the invention corresponding to above Formula II, the procedure varies somewhat depending on whether the product desired is the bis (symmetrical) species or the unsymmetrical species. To prepare the trinuclear compounds, the procedure is in general the same as that described above for the preparation of the compounds of Formula I, except that ($a$) the intermediate of Formula III is always 3-thietanone-1,1-dioxide, i.e., the specific compound defined when each of $R_2$ and $R_3$ are hydrogen atoms, ($b$) the proportions of Formula III and IV (or V) are approximately in the ratio of one molecular proportion of the former to two molecular proportions or more of the latter, and ($c$) the reaction is advantageously carried out at the reflux temperatures of the reaction mixtures.

To prepare the species of the invention corresponding to those where $d$ is 1, a convenient method is to react a dye compound such as represented by above Formula I, wherein $R_2$ and $R_3$ each stands for a hydrogen atom, with approximately an equimolar proportion of a cycloammonium quaternary salt selected from those represented by the following general formula:

(VI) 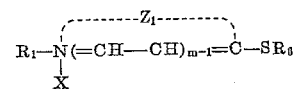

wherein $m$, $R_1$, X and $Z_1$ are as previously defined, except that $Z_1$ may be a different heterocyclic nucleus than Z, and wherein $R_6$ represents an alkyl group of from 1–12 carbon atoms, benzyl, phenyl or tolyl groups. To prepare the species of the invention corresponding to those where $d$ is 2 or 3, as illustrated by following Examples 7–10, a dye compound of Formula I, where $R_2$ and $R_3$ each stand for a hydrogen atom, is reacted in approximately equimolar amount with a cycloammonium quaternary salt selected, for example, from those represented by the following general formula:

(VII) 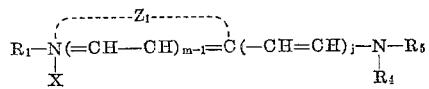

wherein $m$, $j$, $R_1$, $R_4$, $R_5$, X and $Z_1$ are as previously defined, except that $Z_1$ may be a different heterocyclic nucleus than Z. The condensation reactions with the intermediates of Formulas VI and VII are carried out at temperatures up to the reflux temperature of the mixture, in the presence of a basic condensation agent and an inert solvent such as mentioned above in the preparation of the intermediate dye of above Formula I. The trinuclear dye product can be isolated from the reaction by precipitation with a nonsolvent, for example, methanol and water, followed by recrystallization from ethanol or N,N-dimethylformamide or mixtures of the latter with lower alkanols.

The heterocyclic intermediates represented by above Formulas IV, V, VI and VII are described in the literature, such as in Brooker and White, U.S. Reissue Patent 24,292, dated March 19, 1957. The 3-thietanone-1,1-dioxide intermediates represented by above Formula III can be prepared by the general processes described in copending application of James C. Martin, Serial No. 274,850, filed April 22, 1963, for example, by hydrolysis of 3,3-dialkoxythietane-1,1-dioxides in the presence of dilute mineral acids.

The following examples will serve to illustrate more fully the manner whereby we prepare and use the new undissociated dyes of our invention.

EXAMPLE 1

*2 - [(3 - Ethyl - 2 - Benzoxazolinylidene)Ethylidene] - 3-Thietanone-1,1-Dioxide*

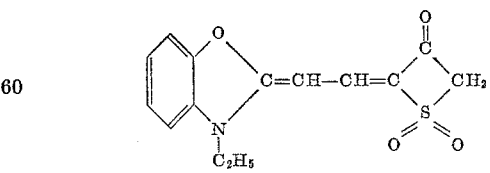

3-thietanone-1,1-dioxide (0.24 g., 1 mol.), 2-β-acetanilidovinyl-3-ethylbenzoxazolium iodide (0.86 g., 1 mol.) and triethylamine (1.0 ml., 1 mol. +250%) were dissolved in methyl alcohol (10 ml.). The reaction mixture was stirred vigorously at the ambient temperature for eighty minutes, during which time a solid precipitated from solution. The reaction mixture was chilled overnight. The crude dye was filtered off, washed with methyl alcohol and dried. After two recrystallizations from ethyl alcohol, the yield of purified dye was 0.029 g. (5%), M.P. 230–231° C. dec.

EXAMPLE 2

*2,4-Bis[(3-Ethyl-2-Benzoxazolinylidene)Ethylidene] - 3-Thietanone-1,1Dioxide*

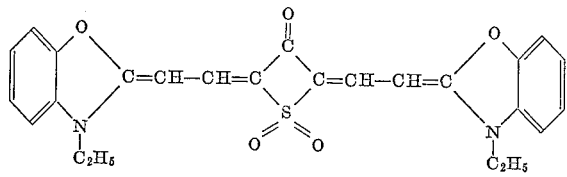

3-thietanone-1,1-dioxide (1.0 g., 1 mol.), 2-β-acetanilidovinyl-3-ethylbenzoxazolium iodide (8.2 g., 1 mol. +15%) and triethylamine (5 ml., 1 mol. +330%) were dissolved in pyridine (20 ml.). The reaction mixture was heated under reflux for five minutes. After cooling, the reaction mixture was diluted with water (500 ml.) and chilled overnight. The crude dye filtered off and dried. After recrystallization from ethyl alcohol, the yield of purified dye was 0.45 g. (12%), M.P. 228–230° C. dec.

EXAMPLE 3

*2,4-Bis[(3-Ethyl - 2 - Benzothiazolinylidene)Ethylidene]-3-Thietanone-1,1-Dioxide*

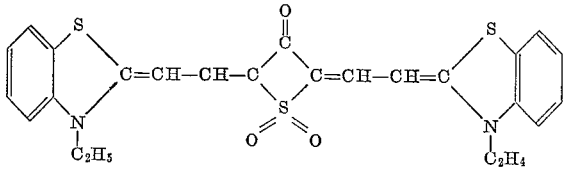

3-thietanone-1,1-dioxide (0.3 g., 1 mol.), 2-β-acetanilidovinyl-3-ethylbenzothiazolium iodide (2.3 g., 2 mol.) and triethylamine (1 ml., 1 mol. +180%) were dissolved in ethyl alcohol (20 ml.). The reaction mixture was heated under reflux for thirteen minutes, then chilled overnight. The crude dye was filtered off, washed with ethyl alcohol, and dried. After two recrystallizations from pyridine and methanol the yield of purified dye was 0.45 g. (36%), M.P. 246–247° C. dec.

EXAMPLE 4

*2,4-Bis[(1,3,3-Trimethyl-2 - Indolinylidene)Ethylidene]-3-Thietanone-1,1-Dioxide*

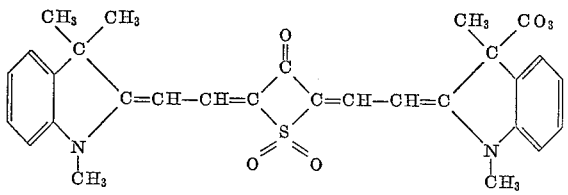

3-thietanone-1,1-dioxide (0.24 g., 1 mol.), 2-β-acetanilidovinyl-1,3,3-trimethylpseudoindolium iodide (1.8 g., 2 mol.), and triethylamine (1 ml., 1 mol. +250%) were dissolved in ethyl alcohol (15 ml.). The reaction mixture was heated under reflux for seven minutes, then chilled overnight. The crude dye was filtered off, washed with methyl alcohol and dried. After two recrystallizations from pyridine and methanol the yield of purified dye was 0.38 g. (39%), M.P. 255–258° C. dec.

EXAMPLE 5

*2,4-Bis[(1-Ethylnaphtho[1,2-d]Thiazolin - 2 - Ylidene) Ethylidene]-3-Thietanone-1,1-Dioxide*

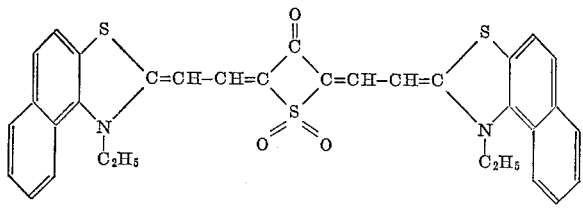

3-thietanone-1,1-dioxide (0.24 g., 1 mol.), 2-β-anilinovinyl-1-ethylnaphtho[1,2-d]thiazolium p-toluenesulfonate (2.0 g., 2 mol.), acetic anhydride (2 ml., 1 mol. +400%), and triethylamine (1 ml., 1 mol. +250%) were dissolved in ethyl alcohol (15 ml.). The reaction mixture was heated under reflux for eighteen minutes, then chilled overnight. The crude dye was filtered off, washed with methyl alcohol and dried. The crude dye was stirred with boiling pyridine (25 ml.), cooled and methyl alcohol (25 ml.) was added to the mixture. After filtration, the residue was stirred with boiling pyridine (100 ml.) and filtered hot. The residue was washed with methyl alcohol and dried. After two recrystallizations from dimethylformamide the yield of purified dye was 0.007 g. (0.6%), M.P. 254–256° C. dec.

EXAMPLE 6

*2,4-Bis[(3-Methyl-2 - Thiazolidinylidene)Ethylidene] - 3-Thietanone-1,1-Dioxide*

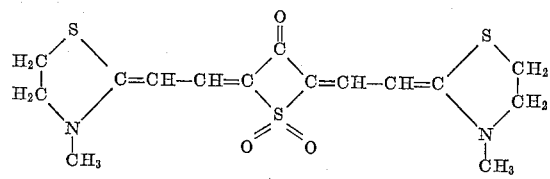

3-thietanone-1,1-dioxide (0.24 g., 1 mol.), 2-β-anilinovinyl-3-methylthiazolinium iodide (1.4 g., 2 mol), acetic anhydride (2 ml., 1 mol. +400%), and triethylamine (1 ml., 1 mol. +250%) were dissolved in ethyl alcohol (15 ml.). The reaction mixture was heated under reflux for eleven minutes, then chilled overnight. The crude dye was filtered off, washed with methyl alcohol and dried. After recrystallization from pyridine and methanol the yield of pure dye was 0.006 g. (0.8%), M.P. 243–245° C. dec.

EXAMPLE 7

*2-(3-Ethyl-2-Benzothiazolinylidene)-4-[(3-Ethyl-2 - Benzoxazolinylidene)Ethylidene]-3-Thietanone-1,1Dioxide*

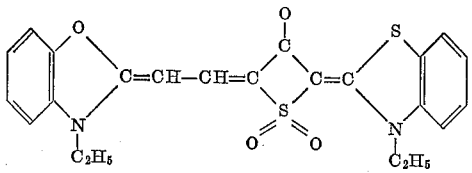

2-[(3-ethyl-2-benzoxazolinylidene)ethylidene] - 3-thietanone-1,1-dioxide prepared according to Example 1 (0.58 g., 1 mol.), 3-ethyl-2-phenylthiobenzothiazolium iodide (1.00 g., 1 mol. +25%) and triethylamine (2 ml., 1 mol. +600%) were dissolved in dimethylformamide (30 ml.). The reaction mixture was heated under reflux for two minutes. After cooling, the reaction mixture was diluted with methanol and water. The crude dye was filtered off, washed with water and dried. After two recrystallizations from dimethylformamide and methanol the yield of purified dye was 0.03 g. (3%), M.P. 257–258° C. dec.

EXAMPLE 8

*2-[(3-Ethyl-2-Benzothiazolinylidene)Ethylidene]-4 - [(3-Ethyl-2 - Benzoxazolinylidene)Ethylidene] - 3 - Thietanone-1,1-Dioxide*

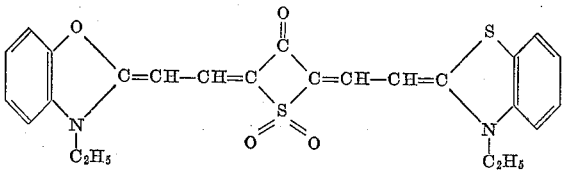

2-[(3-ethyl-2-benzoxazolinylidene)ethylidene]-3 - thietanone-1,1-dioxide prepared according to Example 1 (0.58 g., 1 mol.), 2-β-acetanilidovinyl-3-ethylbenzothiazolium iodide (0.90 g., 1 mol.), and triethylamine (2 ml., 1 mol. +600%) were dissolved in dimethylformamide (28 ml.). The reaction mixture was heated under reflux for three minutes. After cooling, the reaction mixture was diluted with methanol and water. The crude dye was filtered off, washed with water and dried. After two recrystallizations from ethyl alcohol the yield of purified dye was 0.36 g. (37%), M.P. 230–232° C. dec.

EXAMPLE 9

*2-[(3-Ethyl-2 - Benzoxazolinylidene)Ethylidene] - 4 - (1-Methyl-2(1H)-Quinolylidene)-3-Thietanone-1,1-Dioxide*

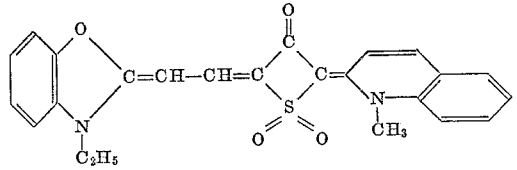

2-[(3-ethyl-2-benzoxazolinylidene)ethylidene] - 3-thietanone-1,1-dioxide prepared according to Example 1 (0.44 g., 1 mol.), 1-methyl-2-phenylthioquinolinium iodide (0.75 g., 1 mol. +33%), and triethylamine (1.5 ml., 1 mol. +600%) were dissolved in dimethylformamide (11 ml.). The reaction mixture was heated under reflux for four minutes, then chilled for two hours. Dilution of the chilled reaction mixture with methanol, followed by vigorous scratching of the sides of the container with a glass rod, gave the crude dye which was filtered off and dried. After two recrystallizations from dimethylformamide and methanol the yield of purified dye was 0.11 g. (17%), M.P. 260–261° C. dec.

EXAMPLE 10

*2-[(3-Ethyl-2-Benzoxazolinylidene)Ethylidene] - 4 - (1-Methylnaphtho[1,2-d]Thiazolin-2-Ylidene)-3 - Thietanone-1,1-Dioxide*

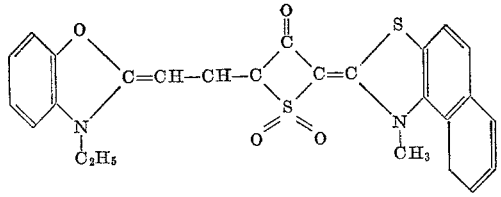

2-[(3-ethyl-2-benzoxazolinylidene)ethylidene] - 3 - thietanone-1,1-dioxide prepared according to Example 1 (0.29 g., 1 mol.), 1-methyl-2-methylthionaphtho[1,2 - d]thiazolium p-toluenesulfonate (0.50 g., 1 mol. +20%), and triethylamine (1 ml., 1 mol. +600%) were dissolved in dimethylformamide (11 ml.). The reaction mixture was heated under reflux for five minutes, cooled, and diluted with methanol. The crude dye was filtered off and dried. After two recrystallizations from dimethylformamide and methanol the yield of purified dye was 0.09 (18%), M.P. 272–273° C. dec.

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of our new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The concentration of our new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of our new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of our dyes, 10 to 20 mgs. of dye per liter of emulsion suffice to produce the maximum sensitizing effect with the ordinary gelatino-silver bromide (including bromoiodide and chlorobromide) emulsions. With fine-grain emulsions, which include most of the ordinary employed gelatino-silver chloride emulsions, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

Photographic elements containing our dyes may be coated on any of the usual photographic support materials including, for example, paper, glass, cellulose acetate, cellulose nitrate, synthetic film-forming resins (e.g., polystyrene, polyesters, polyamides, etc.), etc.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen 2,540,085, granted February 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U.S. 2,540,086, granted February 6, 1951), potassium chloropalladate (R. E. Stauffer et al. U.S. 2,598,079, granted May 27, 1952), etc., or mixture of such sensitizers; antifoggants, such as ammonium chloroplatinate (A. P. H. Trivelli et al. U.S. 2,-566,245, granted August 28, 1951), ammonium chloroplatinite (A. P. H. Trivelli et al. U.S. 2,566,263, granted August 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller U.S. 1,763,533, granted June 10, 1930), chrome alum (U.S. 1,763,533), glyoxal (J. Brunken U.S. 1,870,354, granted August 9, 1932), dibromacrolein (O. Block et al. British 406,750, accepted March 8, 1934), etc.; color couplers, such as those described in I. F. Salminen et al. U.S. Patent 2,423,730, granted July 7, 1947, Spence and Carroll U.S. Patent 2,640,776, issued June 2, 1953, etc.; or mixtures of such addenda. Dispersing agents for color couplers, such as those set forth in U.S. patents to E. E. Jelley et al. 2,322,027, granted June 15, 1943, and L. D. Mannes et al. 2,304,940, granted December 15, 1942, can also be employed in the above-described emulsions.

The sensitizing effect of a number of the new dyes of our invention is illustrated in the following tabulation where the sensitizing range and sensitizing maximum values are shown for these dyes. The dyes were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsion. After digestion at 50° C. for 10 minutes, the emulsions were coated at a coverage of 432 mg. of Ag/ft.$^2$ on a cellulose acetate film support. A sample of each coating was exposed on a sensitometer and to a wedge spectrograph, processed for 3 minutes in developer, fixed, washed and dried.

SENSITIZING DATA

| Dye of Example number | Sensitizing range (mμ) | Sensitizing maximum (mμ) |
| --- | --- | --- |
| 2 | to 700 | 650 |
| 3 | 575 to 745 | 710 |
| 4 | 565 to 695 | 670 |
| 5 | 615 to 800 | 775 |
| 6 | to 650 | 600 |

Examples 2–6 represent the preferred trinuclear dyes.

The invention has been described in detail with particular reference to preferred embodiments thereof, but it will be understood that variations and modifications can be effected within the spirit and scope of the invention as described hereinabove and as defined in the appended claims.

We claim:
1. An undissociated dye selected from those represented by the following general formulas:

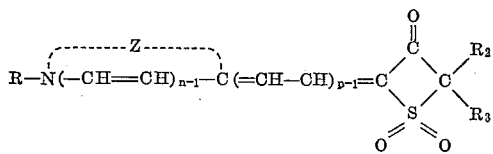

and

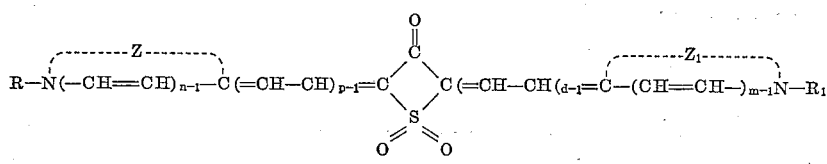

wherein $n$ and $m$ each represents a positive integer of from 1 to 2, $p$ represents an integer of from 1 to 3, $d$ represents an integer of from 1 to 3, R and $R_1$ each represents an alkyl group of from 1 to 12 carbon atoms, $R_2$ and $R_3$ each represents a member selected from the group consisting of the hydrogen atom, an alkyl group of from 1 to 8 carbon atoms, and a monocyclic aryl group, and Z and $Z_1$ each represents the non-metallic atoms necessary to complete a heterocyclic nucleus containing from 5 to 6 atoms in a heterocyclic ring.

2. An undissociated dye having the general formula:

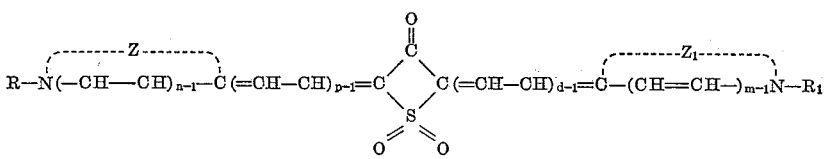

wherein $n$ and $m$ each represents a positive integer of from 1 to 2, $p$ represents an integer of from 1 to 3, $d$ represents an integer of from 1 to 3, R and $R_1$ each represents an alkyl group of from 1–12 carbon atoms, and Z and $Z_1$ each represents the non-metallic atoms necessary to complete a heterocyclic nucleus containing from 5 to 6 atoms in the heterocyclic ring.

3. The undissociated cyanine dye having the formula:

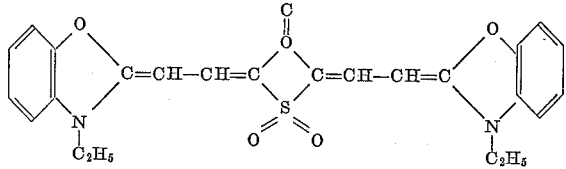

4. The undissociated cyanine dye having the formula:

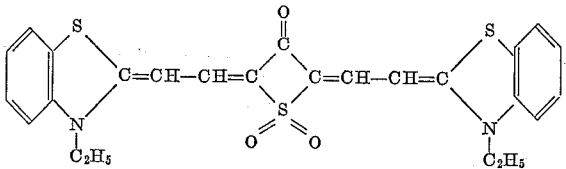

5. The undissociated cyanine dye having the formula:

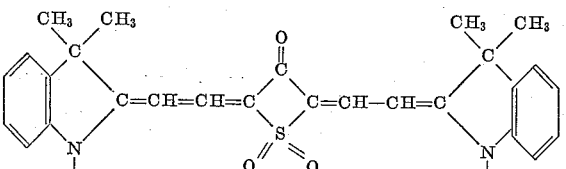

6. The undissociated cyanine dye having the formula:

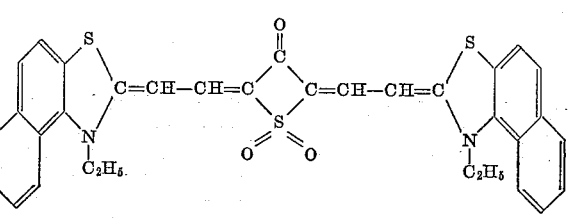

7. The undissociated cyanine dye having the formula:

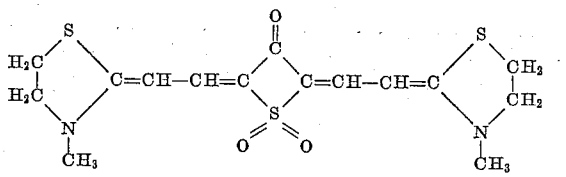

8. A light-sensitive photographic emulsion comprising a hydrophilic colloid, light-sensitive silver halide and an undissociated dye selected from those represented by the following general formulas:

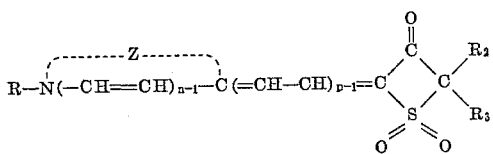

and

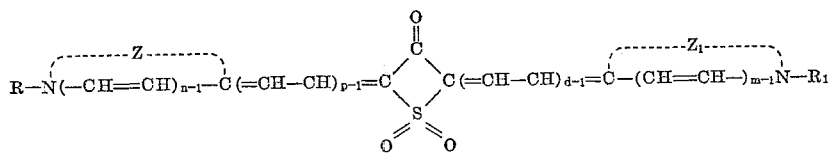

wherein $n$ and $m$ each represents a positive integer of from 1 to 2, $p$ represents an integer of from 1 to 3, $d$ represents an integer of from 1 to 3, R and $R_1$ each represents an alkyl group of from 1 to 12 carbon atoms, $R_2$ and $R_3$ each represents a member selected from the group consisting of the hydrogen atom, an alkyl group of from 1 to 8 carbon atoms, and a monocyclic aryl group, and Z and $Z_1$ each represents the non-metallic atoms necessary to complete a heterocyclic nucleus containing from 5 to 6 atoms in a heterocyclic ring.

9. A light-sensitive photographic emulsion comprising a hydrophilic colloid, light-sensitive silver halide and an undissociated cyanine dye having the general formula:

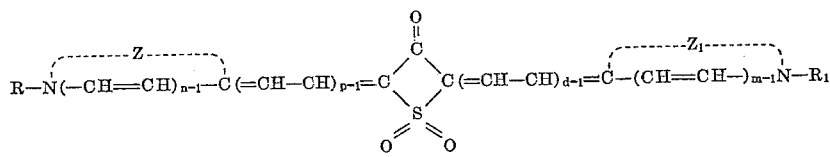

wherein $n$ and $m$ each represents a positive integer of from 1 to 2, $p$ represents an integer of from 1 to 3, $d$ represents an integer of from 1 to 3, R and $R_1$ each represents an alkyl group of from 1 to 12 carbon atoms, and Z and $Z_1$ each represents the non-metallic atoms necessary to complete a heterocyclic nucleus containing from 5 to 6 atoms in the heterocyclic ring.

10. A light-sensitive photographic emulsion comprising a hydrophilic colloid, light-sensitive silver halide and an undissociated cyanine dye having the general formula:

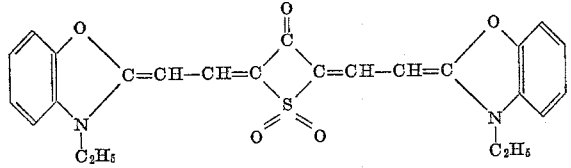

11. A light-sensitive photographic emulsion comprising a hydrophilic colloid, light-sensitive silver halide and the undissociated cyanine dye having the formula:

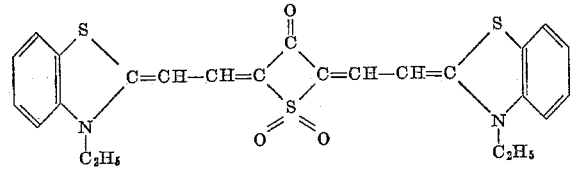

12. A light-sensitive photographic emulsion comprising a hydrophilic colloid, light-sensitive silver halide and the undissociated cyanine dye having the formula:

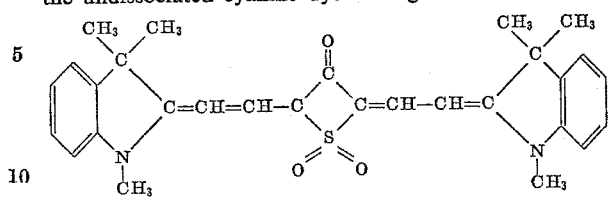

13. A light-sensitive photographic emulsion comprising a hydrophilic colloid, light-sensitive silver halide and the undissociated cyanine dye having the formula:

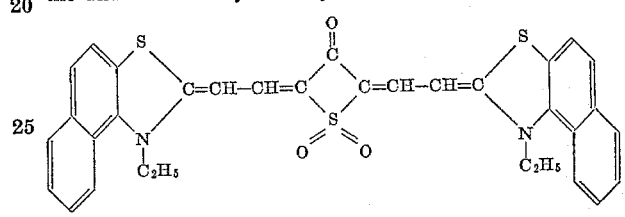

14. A light-sensitive photographic emulsion comprising a hydrophilic colloid, light-sensitive silver halide and the undissociated cyanine dye of the formula:

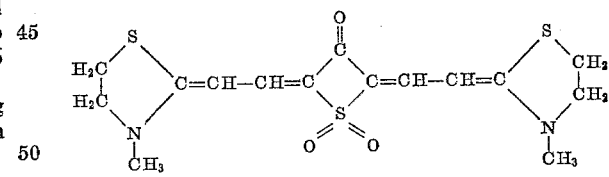

15. A light-sensitive photographic element comprising a support material, and at least one hydrophilic colloid layer containing light-sensitive silver halide and an undissociated dye selected from those represented by the following formulas:

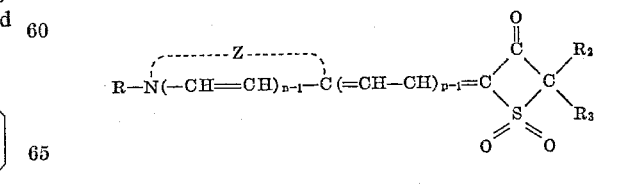

and

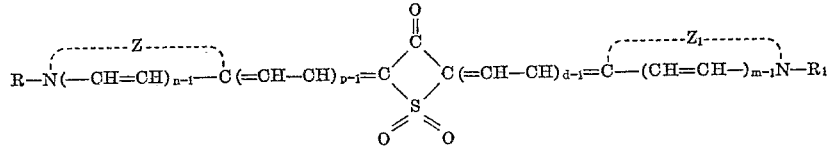

wherein $n$ and $m$ each represents a positive integer of from 1 to 2, $p$ represents an integer of from 1 to 3, $d$ represents an integer of from 1 to 3, R and $R_1$ each represents an alkyl group of from 1 to 12 carbon atoms, $R_2$ and $R_3$ each represents a member selected from the group consisting of the hydrogen atom, an alkyl group of from 1 to 8 carbon atoms, and a monocyclic aryl group, and Z and $Z_1$ each represents the non-metallic atoms necessary to complete a heterocyclic nucleus containing from 5 to 6 atoms in a heterocyclic ring.

References Cited in the file of this patent

UNITED STATES PATENTS

| | | |
|---|---|---|
| 2,895,955 | Haseltine et al. | July 21, 1959 |
| 2,955,939 | Brooker et al. | Oct. 11, 1960 |
| 2,965,486 | Brooker et al. | Dec. 20, 1960 |
| 2,984,664 | Fry et al. | May 16, 1961 |